May 13, 1941.  P. BARNETT  2,241,383
TREE ROOT CUTTING MACHINE
Filed Dec. 22, 1938   3 Sheets-Sheet 2
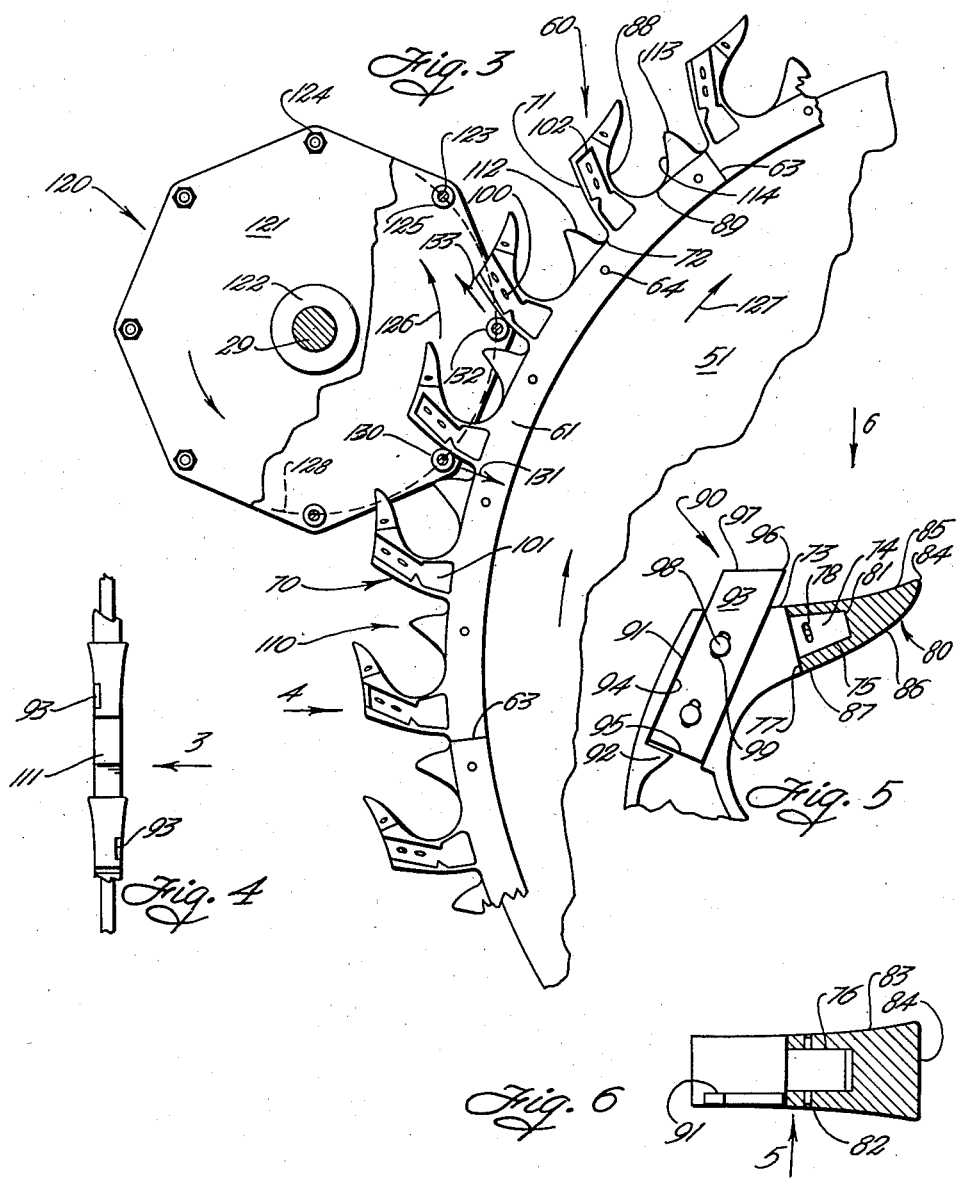
Inventor
PERNEL BARNETT
By Hazard and Miller
Attorneys

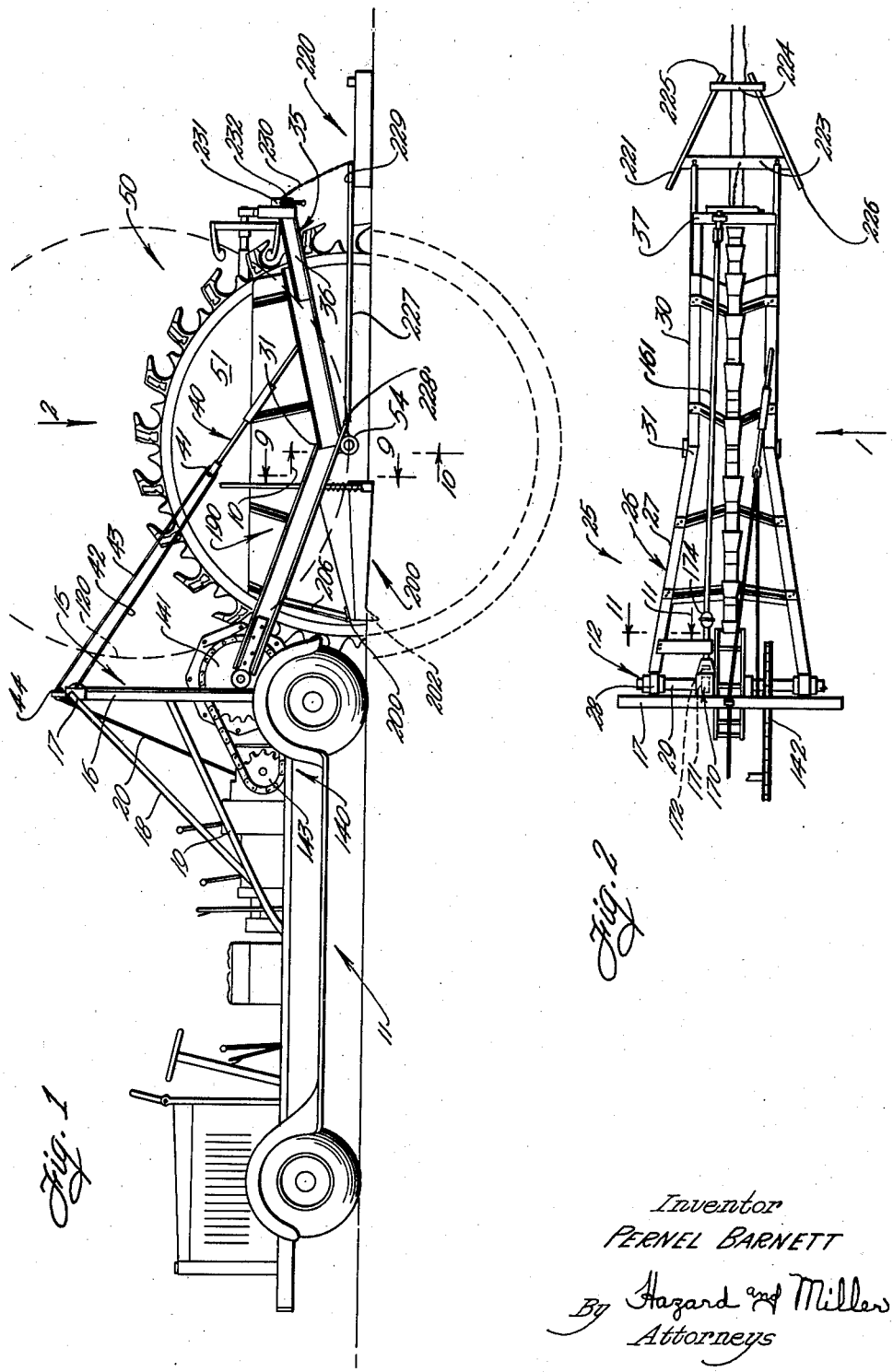

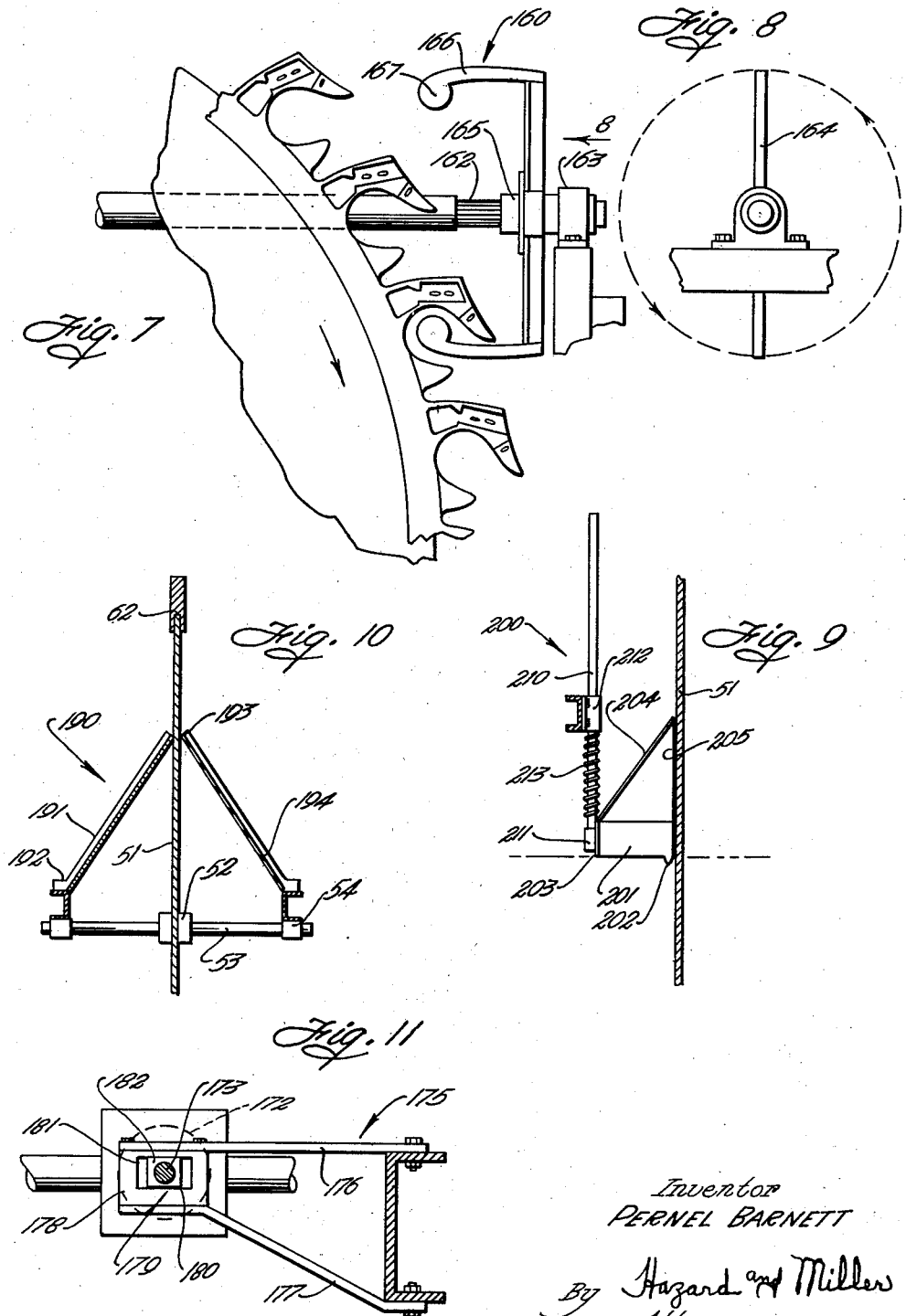

Patented May 13, 1941

2,241,383

UNITED STATES PATENT OFFICE 2,241,383

TREE ROOT CUTTING MACHINE

Pernel Barnett, Orange, Calif.

Application December 22, 1938, Serial No. 247,227

12 Claims. (Cl. 37—94)

My invention comprehends a machine for operating lengthwise of a row of trees in order to cut the roots and to extend the cutting to such depth that spreading roots are cut, thus preventing robbing of adjacent soil of water and fertility.

In a good many agricultural districts, particularly devoted to growing fruits, it is customary on the boundaries of groves or fields to have a row of trees usually for the purpose of a windbreak. These trees necessarily must grow to considerable height to be of much value, depending, of course, upon the height of the crop to be protected. However, practically all trees used for windbreak purposes have extensive spreading roots. These advance into the soil adjacent the rows of fruit trees or other crops and rob such soil of moisture and fertilizing values. It has, therefore, been a common practice to excavate trenches longitudinally of the row of windbreak trees and either in the excavating procedure or after a trench is excavated, cut the roots. Such procedure, however, necessitates making a trench of quite considerable width which manifestely removes an unnecessary amount of soil.

Further, in this type of root cutting by trenching quite frequently the roots are only torn and on release come back to their original contiguous position of the root stem from the trunk and the severed root stem so that the break becomes healed over and therefore the whole of the root continues to function as before being cut.

With my machine and equipment, there is an absolute and clean cut through the root system always removing a short section of each root intersecting a pathway of the machine. In cutting the roots manifestly to reach to the desired depth a certain amount of the earth must be removed that is brought to the surface, but as the machine progresses this is immediately returned so that the narrow trench or longitudinal cut in the ground is again filled leaving the root system completely severed.

An object and characteristic of my invention, therefore, is the employment of a large circular saw mounted preferably trailing behind a power truck which moves slowly along the row of trees. The mounting and construction of the saw permit this to be lowered into the ground as it is rotated and the teeth of the saw sever the roots and carry a narrow portion of the soil to the surface.

A further characteristic of my invention is constructing the saw in such a manner that the teeth cut into the soil bringing this to the ground level and immediately the soil is discharged or spread laterally between adjacent teeth while these teeth perform the function of cutting the root system. However, in some soils clods stick or remain in the teeth and therefore, another characteristic of my invention is the incorporation of a clod remover in the form of rotating arms somewhat similar to a bat synchronized with the movement of the teeth to strike the clods between the teeth and forcibly dislodge these.

Another characteristic of my invention relates to the drive of the saw to develop the rotary action. In view of the fact that the saw must be of large diameter to extend a considerable distance into the soil, the axle of the saw always being above the ground surface for practical purposes it is necessary to apply the driving force adjacent the periphery of the saw. Therefore, my invention comprehends effecting this driving on the teeth of the saw so that by a type of small and large gear the saw is rotated. The large gear may be considered as having the teeth of the gear formed by the teeth of the saw, the back of the teeth being shaped each to be engaged by a roller on the small driving wheel. Thus, the rollers engaging the back of each tooth in succession rotate the disc saw on its axis.

A further characteristic of my invention is providing secondary driving teeth which are used for reverse motion. Such reverse motion is necessary as sometimes the saw teeth jam on a tough or large root. Therefore, these secondary teeth are so shaped that by a reverse motion of the driving teeth and its rollers the disc saw may be given a reverse rotation. This however need only be for part of a circle.

Another characteristic of my invention resides in the pivoting movement of the disc saw for lowering this into the ground and raising. For this purpose I employ a stout framework having beams in which the pivotal center is at the axis of rotation of the driving wheel having the rollers.

A further characteristic in regard to the clod removing device in which the bats move transversely to the disc of the saw is having a drive with synchronizing gears centered to operate from the axis of rotation of the spreading arms and of the small driving wheel.

A further characteristic of my invention resides in certain earth spreaders including a forward set which operate somewhat in the nature of scrapers catching the soil lifted by the saw teeth and forced laterally outwardly to leave a clear space for the operation of the saw. The saw rotates in a reverse direction in the ground to that of the forward movement of the machine, hence the soil is brought to the surface at the fore-portion of the saw, then forced laterally from the slot cut from the saw by the forward scrapers.

A further characteristic of my invention includes a rear set of scrapers trailing on the ground which catch the earth formed into two rows on each side of the saw cut slot and feeds such soil back into the slot, thereby filling in the narrow trench cut by the saw. Various other features of my invention relate to the specific construction of the saw teeth, these preferably being made in segments attached to a metal disc and other details relate to the specific formation of the teeth and detachable cutters used with certain types of trees which have large and particularly tough roots.

My invention is illustrated in connection with the accompanying drawings, in which:

Fig. 1 is a side elevation taken in the direction of the arrow 1 of the root cutting machine illustrating a conventional type of truck with the saw equipment suspended from the rear end thereof.

Fig. 2 is a plan taken in the direction of the arrow 2 of Fig. 1 omitting however the truck and part of the hoisting mechanism.

Fig. 3 is an enlarged partial elevation illustrating the driving wheel operating on the teeth of the saw for rotation of the saw. This may be considered in part as taken in the direction of the arrow 3 of Fig. 4.

Fig. 4 is an edge view of the saw taken in the direction of the arrow 4 of Fig. 3.

Fig. 5 is a side elevation partly broken away illustrating details of one of the saw teeth.

Fig. 6 is a detail view of Fig. 5 in the direction of the arrow 6 showing a tooth tip in section.

Fig. 7 is an enlarged side elevation of a portion of Fig. 1 illustrating the batting device for discharging clods of soil lodged in the saw teeth.

Fig. 8 is an end elevation of part of the batting device taken in the direction of the arrow 8 of Fig. 7.

Fig. 9 is a detail vertical transverse section on the line 9—9 of Fig. 1 in the direction of the arrows illustrating the arrangement and mounting of the forward soil spreader.

Fig. 10 is a vertical transverse section on the line 10—10 of Fig. 1 taken in the direction of the arrows illustrating the soil baffles spreading the soil dropped from the teeth of the saw.

Fig. 11 is a detail vertical transverse section on the line 11—11 of Fig. 2 illustrating the guard arms for the drive shaft of the clod batting device.

Referring first to the main construction as shown in Figs. 1 and 2, it is to be understood that I may use any type of suitable truck designated by the numeral 11. Such truck must have the characteristics of power drive for slow movement along a row of trees and also have a power equipment with changeable speed gears to positively rotate the saw for forming the narrow slot or trench in the ground and cutting the roots, also the truck is provided with a hoisting mechanism to raise and lower the entire saw equipment. One of the essential characteristics is that the truck has a substantial bearing or journal construction 12 for the main pivot shaft of the frame supporting the disk saw. There is also the hoisting equipment 15 having upright posts 16, a cross beam 17, diagonal struts 18 and 19 with a cable connection indicated at 20 and suitable winch for operating the cable to raise and lower the frame of the saw.

The frame 25 consists of two similar side arm assemblies 26, each having an inner arm 27 having a pivot journal 28 on the shaft 29, this shaft being mounted in the journals 12. This acts as a thrust shaft or a pivot for the frame. The outer arms 30 of the frame are connected to the inner arms 27 in such a manner as to form an angle joint 31, these being preferably made of two overlapping channel beams welded together. The angle formed is an obtuse angle, the reason of this being so that the outer arm in all cases must be clear of the ground surface. A relatively light extension frame 35 is formed by lighter weight beams 36 secured to the beams 30 and extending beyond the periphery of the saw and having a transverse or cross member 37. This frame may be raised or lowered having lifting rods 40 on each side preferably made in the form of a turn-buckle and each attached to the beam 30. A reversing pulley 41 is on the end of the rod and in the illustration I employ a stationary strand 42 and a running strand 43 of the cable 20 leading over a block 44 at the top of the hoisting strut assembly, that is, the posts 16 and the cross beam 17. By using this construction the whole frame may be raised and lowered pivoting on the axis of the shaft 29.

The saw construction and mounting designated by the assembly 50 includes a saw disk 51 which has a hub 52 mounted on a supporting shaft 53, note Fig. 10, this shaft being mounted in bearings or boxes 54 secured to the side beam assemblies adjacent the angle 31 of the inner beams 27 and the outer beams 30. It is to be noted that the inner beams converge so that their inner ends 28 are spaced as wide a distance apart as possible in order to give a lateral rigidity to the blade mounting. The disk is preferably rigidly secured to the shaft 53 and presumably such shaft rotates in the bearing boxes 54 which may be kept suitably lubricated. The tooth assembly 60, note particularly Figs. 3 through 7, includes a series of segmental castings 61 forming the base of the teeth and arcuate, each segment being channeled at 62, note Fig. 10, the segments designated at the preferably radial joints 63 and the segments are secured by rivets or the like 64 to the peripheral portion of the disk 51, such periphery being a circle.

An important feature of my invention is the specific construction of the teeth, as these teeth employ the excavating root sawing and drive assembly in the construction of the teeth. The characteristics of the forward drive tooth also functioning as the sawing or cutting tooth designated 70, note Figs. 3 and 7, resides in a rear convex curved edge 71 extending outwardly from the root 72 forming the base of the tooth. Such tooth has a slight convex curve 73 on the outside. A projecting lug 74, note Fig. 5, is formed integral with the main body of the tooth. This has slightly tapered edges 75 on the forward and the rear edges of the lug and parallel side edges 76, note Fig. 6. A distinct shoulder 77 is formed of all sides of the lug. Such lug also has a transverse slot 78. A removable saw tip 80 has an internal socket 81 to fit snugly on the lug 74, the inner edges abutting against the shoulder 76. These saw tips are secured in place by pins 82 which extend through the slots 78. The side edges of the tips are flared outwardly in a slight convex curve as indicated at 83 in Fig. 6 forming a wide pointed edge 84. The outer surface 85 is a slight concave curve forming a continuation of the curve 73 at the outer edge of the integrally cast portion of the tooth assembly. The forward moving portion of the tooth has a convex curve indicated at 86, this merging at a reverse curve 87 with a concave scoop-like curve 88 at the forward part of the tooth leading to the forward part of the root 89 which is a distinct concave curve adjacent the segmental casting 61.

Each tooth is provided with a cutting knife or blade assembly 90 and for which purpose one face of each tooth has a recess 91, note Figs. 5 and 6. The recess has a shoulder 92. The blades 93 are characterized by having parallel edges 94 fitting in the parallel edges of the slot and having a base 95 which if desired may seat against the shoulder 92. The leading outer edge 96 is relatively sharp, the outer face 97 having a bevel forming a clearance for the cuts made by the blades. These blades are secured in place by bolting studs 98 fitting through complementary slots 99 in the blades and 100 in the teeth. It is to be noted that the cutting point of the blades 96 may project quite a considerable distance beyond the end 73 and 85 of the teeth. It is not always necessary to employ these blades, however the teeth are preferably initially made when cast to have the recess 91 with provision for attaching the blades. The slight recess 101 below the shoulder 92 is to lighten the construction. There are recesses such as 91 on opposite sides of each main tooth, however on each alternate tooth there is a closure flange 102 so that the blades 93 are staggered on opposite sides of the tooth assembly and thus on opposite sides of the saw disk 51, note Fig. 4. It is thus manifest by the assembly that the saw tips 80 and the blades 93 may readily be removed for replacement as these are the main elements subject to severe wear.

The reverse motion driving teeth designated by the assembly numeral 110 include a series of small teeth 111 each of which is characterized by a convex curve 112 rising from the root 72 which is a sharp concave curve joining the convex curve 71 of the main portion of the tooth. These curves 71 and 112 are designed and shaped for a contact motion of the driving rollers hereunder designated. These reverse driving teeth terminate at a tip 113 at the outer edge and then have a concave curve 114 which merges with the concave curves 88 and 89 of the main teeth. These teeth 111 are preferably the same width as the base portion of the main teeth and of the main segments 61 as indicated in Fig. 4.

The drive for the saw disk and its teeth is through the immediate agency of the power driving wheel assembly 120, note Figs. 1 and 2 and in particular, Fig. 3. This includes a pair of disks 121 attached by a suitable hub 122 to the main shaft 29. Connecting each disk there is a journal pin 123, this being secured by nuts such as 124 or any suitable manner and on each pin there is a roller 125. These rollers and the pins are made of suitable material for proper lubrication. The rollers are spaced evenly around the driving wheel. This driving wheel may be rotated in any suitable manner as hereunder designated and the direction of the rotation is that of the arrow 126 of Fig. 3 to rotate the saw in the direction of the arrow 127. The pitch circle of the rollers is indicated by the dotted circle 128. In the motion of the rollers which are between the disks, as the driving wheel rotates, engage a tooth as indicated at 130, this being on the surface 71 of the main tooth. As the rotation of the driving wheel continues, the roller moves downwardly towards the root 72 of the tooth, note arrow 131. This root thus must be of sufficient width to accommodate the roller unless of course the design is such that the roller never reaches the root. As the motion continues the roller starts an outward movement as indicated by the position 132 and the arrow 133. Thus the rollers have a true rolling motion on the drive edge or surface 71 of each of the main teeth. The driving force is therefore applied at the periphery of the saw disk 51. In this motion of the rollers in and out of the root portion 72 of the teeth they move along the surface 112 of the teeth 111 but of course in the forward drive this is a free motion without any resistance or driving force, therefore the surface 112 must be so shaped as to accommodate the relative curved path of the rollers 125. However, sometimes the saw jams by engagement with a tough root or the like and it is necessary to have a partial rotation of the saw in a reverse direction. This is done by reversing the direction of rotation of the driving wheel 120 and in this case the driving rollers 125 have a thrust action on the face 112 of each of the reverse driving teeth 111. This gives a rotation of the saw in a direction opposite to that of the arrow 127. However, as above mentioned, it is usually only necessary for this reverse motion to be a short arcuate turn. Another important feature of the reversing teeth 100 having the faces 112 resides in preventing a so-called back slip of the main teeth or saw disk. For instance should the main cutting teeth strike a rock or similar obstruction there is usually a slight bounce back or reversal of the direction of motion of the saw disk. The reversing teeth limit this reverse motion and were it not for these the saw disk might be shifted backwardly so far that it would lose synchronism with the driving rollers of the driving wheel 120. Hence these reversing teeth always keep the teeth on the disk and the rollers on the driving wheel 120 in synchronism and also the clod batting devices are also maintained in proper synchronism.

The drive from the truck to the driving wheel 120 is indicated as being through the sprocket gear train 140 which employs a driven sprocket gear 141 either mounted on the shaft 29 to rotate such shaft or if desired, rotatable on such shaft and connected to the driving wheel 120 by a suitable hub or the like. A sprocket chain 142 leads to a driving sprocket 143 (Note Figs. 1 and 2) which in its turn is actuated by a power drive through a gear reduction train from the power plant on the truck.

The clod removing and clod batting mechanism designated by the assembly numeral 160 is substantially as follows, having reference particularly to Figs. 1, 2, 7 and 8. This comprises a shaft 161 with a splined extension 162, the extension having a journal mounting 163, this being located on the rear transverse member 37. Thus the journal is elevated and lowered with the frame assembly and the disk saw. Secured to the splined extension 162 there are a pair of diametrically extending arms 164 secured thereon by a suitable hub such as 165 and from these arms there are a pair of bats 166 extending forwardly. Each of these bats has a rounded club-like end 167 adapted to pass through the space in the teeth defined by the surface 86 and 87 of the tip of the teeth, the concave curves 88 and 89 and the curve 114 of the small and reverse action teeth 111. The clubs are of such size as to have a good clearance within this curve and the bats are so shaped that they will always have a clearance beyond the ends 84 of the tips of the teeth.

It is necessary to synchronize the rotation of the bats with the driving rotation of the saw teeth. Therefore I mount a gear housing 170 on the main shaft 29 which shaft preferably has a large bevel gear indicated dotted at 171 and a small bevel gear 172 at right angles thereto, this latter gear being connected to a short shaft 173, note Fig. 11, which is connected to the shaft 161 by a universal joint 174. In order to prevent rotation of the gear housing and the shaft 173 there is a restraining bracket 175 having an upper arm 176 and a lower arm 177 secured to one of the beams 27. These arms have a block 178 at the outer end, such block having a rectangular opening 179 defined by the horizontal surface 180 and the vertical edges 181. The housing has a journal extension 182 illustrated as square in cross section fitting in the rectangle 178. This confines the shaft 173 from an up and down movement in a vertical plane but allows a slight movement transversely, hence there is the restriction to the rotation of the housing and gears so that there is a direct rotational drive to the shaft 161 through the universal joint 174 and hence a timed drive to the bats so that these synchronize in their movement with each tooth as it comes adjacent to the point of travel. The bats and the clubs pass through the space of the teeth at such a high speed that there is no danger of the teeth being caught as the teeth are also moving in a circular direction. By this action any clods of dirt which have not dropped free of the teeth of the saw or any roots catching on such teeth are batted loose and free of the teeth before they again enter the soil.

As it is desirable to shift the soil raised from the trench or slot by the rotating saw teeth, I provide an upper soil deflector assembly 190, note Figs. 1, 2 and 10. This includes sloping plates 191 secured by an angle frame such as 192 to the beams 27 and 30 on each side of the saw disk. These plates have their upper edge 193 positioned contiguous to the disk 51 of the saw. It is not necessary that the plates 191 be continuous to the beams 27 and 30 as they may have open spaces indicated at 194 where the frame has a particularly wide spread in order that the dirt dropped from the teeth will not be spread at too remote a distance from the slot or trench cut by the saw, as my invention comprehends a drag scraper to replace the soil. In addition I employ a lateral plow device designated by the assembly numeral 200, note Figs. 1 and 9. This employs a plow share plate 201, there being one of such plates on each side of the frame 25. These have a projecting point 202 which fits close to the disk 51 of the saw and the rear portion 203 is designed to scrape along the ground surface and is spaced a suitable distance from the slot or trench cut by the saw, the covering sheet 204 extends from the plow share plate upwardly on a slope and has an edge 205 contiguous to the saw disk, this being for the purpose of catching any soil which might drop behind the share plate. In order to provide the proper action of the plow share, a rod 206 extends downwardly from each of the beams 27, this being preferably rigidly secured to such beam and has a hinge 209 forming a forward connection to the plow share. This hinge has its pintle horizontal so that the share may tilt up and down. The rear portion of the plow share is depressed by being provided with a vertical rod 210 fitted in a socket 211 adjacent the rear end of the share plate. This rod passes through a guide 212 mounted on the beams 27 and there is a coiled compression spring 213 between the guide 212 and the socket 211 urging the rear end of the plow share downwardly. Therefore in the forward movement of the machine the loose soil excavated by the saw teeth immediately behind the truck is caught by the plow shares and diverted laterally forming two windrows slightly spaced from the slot or trench. The design of the upper soil deflector 190 should be such that the earth dropped from the teeth will fall approximately into this windrow.

A drag scraper 220 is for the purpose of returning the soil to the trench. This includes two drag blades 221 secured to cross framing plates 223 and 224 or any other suitable construction and having the rear edges 225 spaced slightly wider than the slot cut in the ground. The forward edges 226 diverge sufficiently to catch the windrows formed by the plow shares and the soil dropped by the diverting assembly 190. This drag is pulled by a pair of tow bars on each side, there being one bar 227 on each side and connected by a hinge 228 to the frame assembly 25 having the beams 27 and 30 adjacent the lower portion of the obtuse angle 31. The rear portion 229 of the tow bars is secured to the front plate or beam 223. For the purpose of raising the drag above the ground and retaining this elevated when transporting the machine without cutting, a chain or cable 230 is attached to the drag preferably to the cross plate 223 and is wound on a winch 231 located adjacent the rear cross beam 37 of the frame 25 and this winch may be operated by a hand crank 232.

Various changes may be made in the details of the construction without departing from the spirit or scope of the invention as defined by the appended claims.

I claim:

1. A tree root cutting machine comprising in combination a truck chassis having means for moving over the ground and provided with a power plant combined with an elevating lowering and lifting frame with an operating connection to such power plant, a disk of a saw rotatably mounted in such frame on a transverse axis, the disk having soil and root cutting teeth with a forward surface to cut a narrow trench or slot in the ground and elevate the soil and at the same time sever roots, the back of each tooth having a curved surface forming a driving face and a drive wheel with a drive connection to the power plant of the truck, the drive wheel having means to engage the driving faces of each tooth in succession and to rotate the saw disk with its cutting teeth, the saw disk having reversing teeth located one between each of the main cutting and driving teeth, the reversing teeth having a reverse driving face constructed and adapted to be engaged by the driving means of the drive wheel when such drive wheel is operated in a reverse direction to give a reverse movement to the saw disk.

2. A tree root cutting machine comprising in combination a truck chassis having means for moving over the ground and provided with a power plant combined with an elevating lowering and lifting frame with an operating connection to such power plant, a disk of a saw rotatably mounted in such frame on a transverse axis, the disk having soil and root cutting teeth with a forward surface to cut a narrow trench or slot in the ground and elevate the soil and at the same time sever roots, the back of each tooth having a curved surface forming a driving face and a drive wheel with a drive connection to the power plant of the truck, the drive wheel having means to engage the driving faces of each tooth in succession and to rotate the saw disk with its cutting teeth, the frame for mounting the saw disk having a pivotal connection to the truck whereby the frame may be tilted in an arc and as to such pivot and the center of the saw disk follow an arc, the driving wheel having its center of rotation on the axis of the same pivot.

3. A tree root cutting machine in which a truck chassis is provided with means for moving the same over the ground and also having a power equipment for auxiliary purposes combined with an elevating and lowering frame having side beams pivoted to one end of the truck by a transverse pivot, a lifting and lowering means interconnected between the frame and the auxiliary power means of the truck, a disk of a saw rotatably mounted in the frame on a transverse axis whereby the disk may rotate in a vertical plane, the disk having soil and root cutting teeth attached to its periphery to form a narrow trench or slot in the ground and to sever the roots, the soil and root cutting teeth having the characteristic of a concave front face transverse to the plane of the saw with a pointed leading edge to cut the soil and roots, the back of each tooth having a convex thrust surface, a driving wheel having its axis coincident with the pivot of the lifting and lowering frame and provided with a series of rollers positioned to engage the back or driving face of each tooth in succession, a drive connection from the auxiliary power equipment to rotate the driving wheel and thus rotate the saw.

4. A tree root cutting machine as claimed in claim 3, the saw disk having reversing teeth with one reversing tooth located between each of the main or cutting teeth and having a convex reverse driving face merging with the root of the driving face of the main soil and root cutting teeth whereby on a reverse rotation of the driving wheel, the reverse teeth are engaged by the said rollers and the saw disk given a reverse rotation.

5. A tree root cutting machine as claimed in claim 3, a clod removing assembly including a gear system operating on an axis coincident with the pivot of the frame, a shaft driven thereby and having journal mountings in the frame, the said shaft extending substantially parallel to the saw disk, one or more batting arms having clubs on the end operatively connected to the shaft and a drive from the auxiliary power means to said gears to synchronize the bats and the clubs with the movement of the teeth whereby the clubs and bats in traversing cross the saw teeth, remove the clods of soil lodged in the saw teeth.

6. A tree root cutting machine as claimed in claim 3, a pair of plows each including a plow share suspended from the elevating and lowering frame and each having means to engage the soil adjacent the slot or trench cut by the saw and spread the soil so elevated laterally from the trench and a drag scraper connected to the lifting and lowering frame for trailing back of the frame and saw, such drag scraper having blades inclined inwardly in a rearward direction to scrape the material spread laterally by the plow shares to fill the slot or trench back of the saw.

7. A tree root cutting machine having a frame with means for moving said frame over the ground combined with a disk of a saw rotatably mounted in such frame on a transverse axis, the disk having a plurality of soil and root cutting teeth attached to its periphery, each tooth being provided with a forward concave face considered transversely to the plane of the saw and with a pointed leading edge to cut the soils and roots, the back of each tooth having a convex thrust surface, a driving wheel provided with a series of rollers positioned to engage the back or driving face of each tooth in succession, means to rotate the driving wheel whereby the reaction of the rollers and the back or driving face of the teeth rotates the saw disk with the teeth attached thereto, each tooth having a knife attached thereto, each knife comprising a blade adjustably mounted on the saw tooth and the blades projecting beyond the outer edge of each tooth.

8. A tree root cutting machine having a frame with means for moving said frame over the ground combined with a disk of a saw rotatably mounted in such frame on a transverse axis, the disk having a plurality of soil and root cutting teeth attached to its periphery, each tooth being provided with a forward concave face considered transversely to the plane of the saw and with a pointed leading edge to cut the soils and roots, the back of each tooth having a convex thrust surface, a driving wheel provided with a series of rollers positioned to engage the back or driving face of each tooth in succession, means to rotate the driving wheel whereby the reaction of the rollers and the back or driving face of the teeth rotates the saw disk with the teeth attached thereto, each tooth having a removable saw tip having a socket and lug connection to the main portion of the tooth, the lug having the pointed edge of the tooth.

9. A tree root cutting machine in which a frame is mounted for movement over the ground combined with a saw disk rotatably mounted on said frame on a transverse axis, the saw disk having a plurality of teeth mounted on its periphery, such teeth including a series of soil cutting and removing and root cutting teeth characterized by a forward face and a projecting pointed edge and a back driving face, a reversing tooth located between each of these cutting teeth and characterized by a front curved face spaced by the root of the teeth from the convex face of a cutting tooth, a rotatably mounted driving wheel having means to engage the back driving face of the cutting teeth or the curved face of the reversing teeth and means to rotate the driving wheel in opposite directions for a forward or reverse rotation of the saw disk.

10. A tree root cutting machine comprising in combination a disk type of saw having root cutting teeth on its periphery, an axle and journal construction for the disk saw, means to raise and lower the axle and means to rotate the saw with the teeth rising at the forward portion of the saw relative to its motion over the ground, a plow assembly including plow share blades, one positioned on each side of the saw forward of the axle, means to suspend the plow share blades to contact the ground surface no matter whether the saw is lowered for deep cutting or raised for shallow cutting, the said blades being constructed and adapted to divert soil laterally from the forward portion of the saw and the slot cut thereby.

11. A tree root cutting machine as claimed in claim 3, a pair of plows each including a plow share, resiliently suspended from the elevating and lowering frame and located forward of the center of the disk whereby the plow shares ride on the ground surface independent of the depth of cut of the disk saw and spread the soil elevated by the saw disk laterally from the trench cut thereby.

12. A tree root cutting machine comprising in combination a frame, a saw disk rotatably mounted therein, means to raise and lower the frame, the saw having teeth with a forward cutting edge and a rearward driving face, a driving wheel having rollers to engage the driving face of each tooth in succession and thereby rotate the saw disk, the saw disk having reversing teeth with one reversing tooth located between each of the main or cutting teeth and having a convex reverse driving face merging with the root of the driving face of the main soil and root cutting teeth whereby on a reverse rotation of the driving wheel, the reverse teeth are engaged by the said rollers and the saw disk given a reverse rotation.

PERNEL BARNETT.